United States Patent
Yu et al.

(10) Patent No.: US 8,604,710 B2
(45) Date of Patent: Dec. 10, 2013

(54) MULTI-MODE DIMMING CIRCUIT

(75) Inventors: Bo Yu, Hangzhou (CN); Yuancheng Ren, Hangzhou (CN); Lei Du, Hangzhou (CN); Naixing Kuang, Hangzhou (CN); Zhijiang Yang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 231 days.

(21) Appl. No.: 13/224,893

(22) Filed: Sep. 2, 2011

(65) Prior Publication Data

US 2012/0056552 A1 Mar. 8, 2012

(30) Foreign Application Priority Data

Sep. 3, 2010 (CN) .......................... 2010 1 0276366

(51) Int. Cl.
*H05B 37/02* (2006.01)
(52) U.S. Cl.
USPC .......................................... 315/291; 315/308
(58) Field of Classification Search
USPC ...... 315/209 R, 224–226, 291, 307, 308, 312
See application file for complete search history.

(56) References Cited

U.S. PATENT DOCUMENTS 6,445,143 B1 * 9/2002 Min .............................. 315/307

OTHER PUBLICATIONS

U.S. Appl. No. 12/913,699, filed Oct. 27, 2010, Hughes.

* cited by examiner

*Primary Examiner* — Jimmy Vu
(74) *Attorney, Agent, or Firm* — Perkins Coie LLP

(57) ABSTRACT

The present disclosure discloses a multi-mode dimming circuit configurable to operate in a first dimming mode, a second dimming mode and a third dimming mode. The present disclosure also discloses separate dimming circuits for respectively realize the three dimming modes. In one embodiment the multi-mode dimming circuit may comprise a first input terminal, a second input terminal, a third input terminal, an output terminal, a resistive device, an oscillation circuit and a pulse width modulation (PWM) circuit. Users may flexibly configure the multi-mode dimming circuit to operate in one of the three different dimming modes by varying the external devices and/or signals coupled to each of the first, second and third input terminals.

17 Claims, 3 Drawing Sheets

MULTI-MODE DIMMING CIRCUIT

CROSS-REFERENCE TO RELATED APPLICATIONS

This application claims priority to and the benefit of Chinese Patent Application No. 201010276366.3, filed Sep. 3, 2010, which is incorporated herein by reference in its entirety.

TECHNICAL FIELD

This disclosure relates generally to dimming circuits for light emitting elements, and particularly relates to multi-mode dimming circuits configurable to operate in different dimming modes.

BACKGROUND

The statements in this section merely provide background information related to the present invention and may not constitute prior art.

Dimming for light emitting elements is desired in most application circumstances. Currently, pulse-width modulation (PWM) dimming is commonly used for light emitting element dimming. Generally, a PWM dimming signal having a frequency and a duty cycle is applied to control a driving circuit of the light emitting elements to illuminate/extinguish the light emitting elements periodically, so that the illumination of the light emitting elements could be adjusted to a desired level by varying the frequency and/or the duty cycle of the PWM dimming signal.

A need therefore exists for a dimming circuit that could be conveniently configured by the users to obtain desired dimming signals for controlling the light emitting elements at a desired illumination level. To this end, one embodiment of the present invention provide a dimming circuit that is configurable to operate in different dimming modes so that the users could obtain desired dimming signals by providing a few external devices, such as resistors and/or capacitors, to the dimming circuit.

SUMMARY

In one embodiment, a multi-mode dimming circuit configurable to operate in a first dimming mode, a second dimming mode or a third dimming mode, comprises: a first input terminal; a second input terminal; a third input terminal; an output terminal; a first resistive device having a first terminal coupled to the first input terminal, and a second terminal coupled to the second input terminal; an oscillation circuit having an oscillation input terminal coupled to the third input terminal, and an oscillation output terminal configured to provide an oscillation output signal; and a PWM circuit having a first PWM input terminal coupled to the second input terminal, a second PWM input terminal coupled to the oscillation output terminal, and a PWM output terminal coupled to the output terminal, wherein the PWM circuit is configured to compare a signal at the first PWM input terminal with the oscillation output signal to generate a PWM dimming signal having a first duty cycle and a first frequency; and wherein the multi-mode dimming circuit operates in the first dimming mode when the first input terminal is configured to receive a PWM input signal having a second duty cycle and a second frequency, the second input terminal is coupled to a first capacitive device, and the third input terminal is coupled to a second capacitive device such that the oscillation output signal comprises a first triangle signal; and wherein the multi-mode dimming circuit operates in the second dimming mode when the first input terminal is configured to receive the PWM input signal, the second input terminal is idled, and the third input terminal is coupled to a second resistive device such that the oscillation output signal comprises a DC reference signal; and wherein the multi-mode dimming circuit operates in the third dimming mode when the first input terminal is idled, the second input terminal is configured to receive a DC analog signal, and the third input terminal is coupled to a third capacitive device such that the oscillation output signal comprises a second triangle signal.

In one embodiment, a dimming circuit comprises: a first input terminal configured to receive a PWM input signal having a first duty cycle and a first frequency; a second input terminal; a third input terminal; an output terminal configured to provide a PWM dimming signal having a second duty cycle and a second frequency; a first resistive device having a first terminal coupled to the first input terminal, and a second terminal coupled to the second input terminal; a first capacitive device having a first terminal coupled to the second input terminal, and a second terminal connected to ground; a second capacitive device having a first terminal coupled to the third input terminal, and a second terminal connected to ground; an oscillation circuit having an oscillation input terminal coupled to the third input terminal, and an oscillation output terminal configured to provide an oscillation output signal; and a PWM circuit having a first PWM input terminal coupled to the second input terminal, a second PWM input terminal coupled to the oscillation output terminal, and a PWM output terminal coupled to the output terminal, wherein the PWM circuit is configured to compare a signal at the first PWM input terminal with the oscillation output signal to generate the PWM dimming signal.

In one embodiment, a dimming circuit comprises: a second input terminal configured to receive a DC analog signal; a third input terminal; an output terminal configured to provide a PWM dimming signal having a second duty cycle and a second frequency; a third capacitive device having a first terminal coupled to the third input terminal, and a second terminal connected to ground; an oscillation circuit having an oscillation input terminal coupled to the third input terminal, and an oscillation output terminal configured to provide an oscillation output signal; and a PWM circuit having a first PWM input terminal coupled to the second input terminal, a second PWM input terminal coupled to the oscillation output terminal, and a PWM output terminal coupled to the output terminal, wherein the PWM circuit is configured to compare a signal at the first PWM input terminal with the oscillation output signal to generate the PWM dimming signal.

BRIEF DESCRIPTION OF THE DRAWINGS

The following detailed description of the embodiments of the present technology can best be understood when read in conjunction with the following drawings, in which the features are not necessarily drawn to scale but rather are drawn as to best illustrate the pertinent features.

The use of the same reference label in different drawings indicates the same or like components.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the technology can be practiced without one or more specific details, or with other methods, components, materials, etc. In other instances, well-known structures, materials, processes or operations are not shown or described in detail to avoid obscuring aspects of the present invention.

In one embodiment of the present invention, a multi-mode dimming circuit configurable to operate in different dimming modes may comprise a first input terminal, a second input terminal, a third input terminal, an output terminal, a resistive device, an oscillation circuit and a pulse width modulation (PWM) circuit, which will be described in detail in the following descriptions. The multi-mode dimming circuit in accordance with one embodiment of the present invention may be configured to operate in three different dimming modes by varying the external devices and/or signals coupled to each of the first, second and third input terminals. The multi-mode dimming circuit in accordance with one embodiment of the present invention is convenient to use and is cost saving.

Other embodiments of the present invention further provide separate dimming circuits for realizing each of the three dimming modes.

Figure 1:
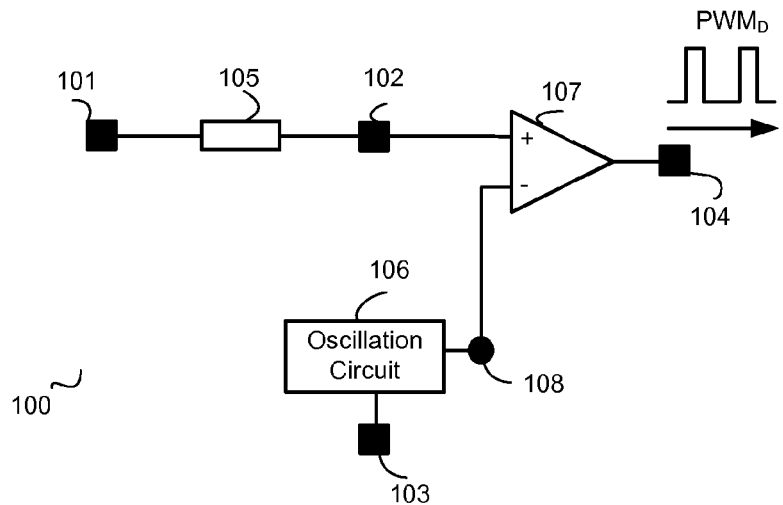
FIG. 1 illustrates schematically a multi-mode dimming circuit 100 in accordance with an embodiment of the present invention.

FIG. 1 illustrates schematically a multi-mode dimming circuit 100 configurable to operate in a PWM input vary-frequency dimming mode (a first dimming mode), a PWM input direct dimming mode (a second dimming mode) and a DC input PWM dimming mode (a third dimming mode) in accordance with an embodiment of the present invention. The multi-mode dimming circuit 100 may comprise a first input terminal 101; a second input terminal 102; a third input terminal 103; an output terminal 104; a first resistive device 105 having a first terminal coupled to the first input terminal 101, and a second terminal coupled to the second input terminal 102; an oscillation circuit 106 having an oscillation input terminal coupled to the third input terminal 103, and an oscillation output terminal configured to provide an oscillation output signal; and a PWM circuit 107 having a first PWM input terminal coupled to the second input terminal 102, a second PWM input terminal coupled, via node 108, to the oscillation output terminal, and a PWM output terminal coupled to the output terminal 104 of the multi-mode dimming circuit 100, wherein the PWM circuit 107 is configured to compare a signal at the first PWM input terminal with the oscillation output signal to generate a PWM dimming signal $PWM_D$ having a first duty cycle and a first frequency.

Figure 2:
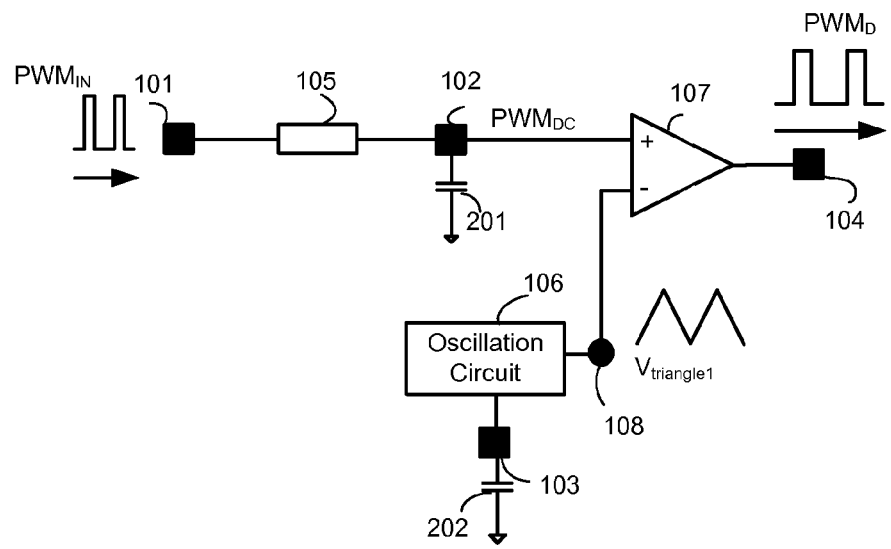
FIG. 2 illustrates schematically the multi-mode dimming circuit 100 configured to operate in a first dimming mode in accordance with an embodiment of the present invention.

In accordance with one embodiment of the present invention, as illustrated in FIG. 2, when the multi-mode dimming circuit 100 is configured to operate in the first dimming mode, the first input terminal 101 is configured to receive a PWM input signal $PWM_{IN}$ having a second duty cycle and a second frequency, the second input terminal 102 is coupled to a first capacitive device 201, and the third input terminal is coupled to a second capacitive device 202 such that the oscillation output signal comprises a first triangle signal $V_{triangle1}$. In one embodiment, the oscillation circuit 106 provides a current to charge/discharge the second capacitive device 202 to generate the first triangle signal $V_{triangle1}$. In the first dimming mode, the first resistive device 105 and the first capacitive device 201 forms a low pass filter, which filters the PWM input signal $PWM_{IN}$ and provides a DC voltage signal $PWM_{DC}$ representing the average amplitude of the PWM input signal $PWM_{IN}$ at the second input terminal 102; the PWM circuit 107 then compares the DC voltage $PWM_{DC}$ with the first triangle signal $V_{triangle1}$ generate the PWM dimming signal $PWM_D$. In this case, the first duty cycle of PWM dimming signal $PWM_D$ substantially follows the second duty cycle of the PWM input signal $PWM_{IN}$. Moreover, the first frequency of the PWM dimming signal $PWM_D$ can be adjusted by adjusting the capacitance of the second capacitive device 202 since changing the capacitance of the second capacitive device 202 may change the frequency of the first triangle signal $V_{triangle1}$.

Figure 3:
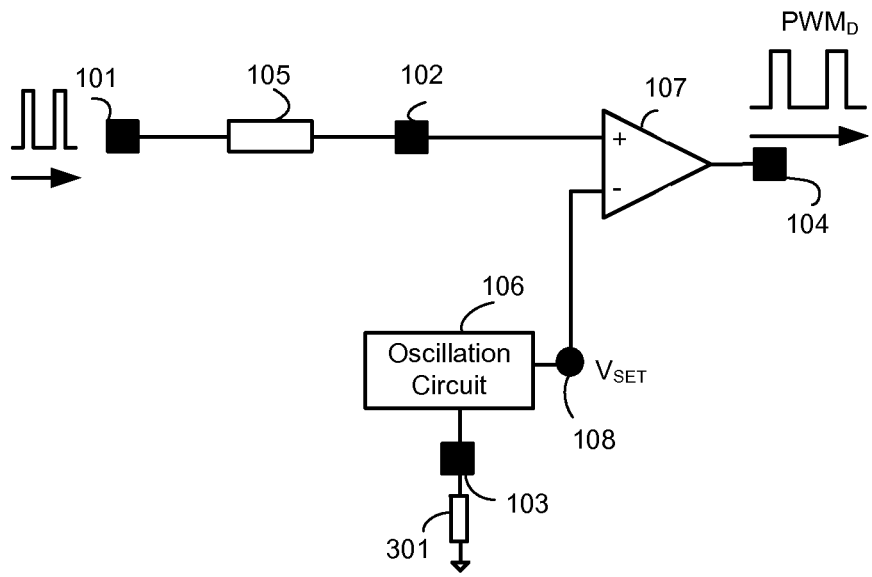
FIG. 3 illustrates schematically the multi-mode dimming circuit 100 configured to operate in a second dimming mode in accordance with an embodiment of the present invention.

In accordance with one embodiment of the present invention, as illustrated in FIG. 3, when the multi-mode dimming circuit 100 is configured to operate in the second dimming mode, the first input terminal 101 is configured to receive the PWM input signal $PWM_{IN}$, the second input terminal 102 is idled, and the third input terminal 103 is coupled to a second resistive device 301 such that the oscillation output signal comprises a DC reference signal $V_{SET}$. In one embodiment, the oscillation circuit 106 provides a current to the second resistive device 301 to generate the DC reference signal $V_{SET}$. In the second dimming mode, since the second input terminal 102 is idled, the signal at the second input terminal 102 comprises the PWM input signal $PWM_{IN}$. Thus, the PWM circuit 107 compares the PWM input signal $PWM_{IN}$ with the DC reference signal $V_{SET}$ to generate the PWM dimming signal $PWM_D$. In this case, the first duty cycle and the first frequency of the PWM dimming signal $PWM_D$ respectively substantially follow the second duty cycle and the second frequency of the PWM input signal $PWM_{IN}$.

Figure 4:
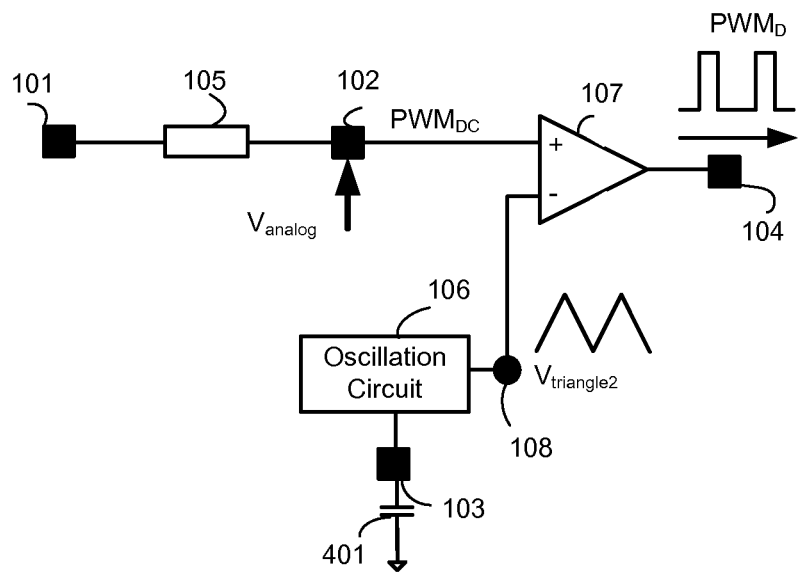
FIG. 4 illustrates schematically the multi-mode dimming circuit 100 configured to operate in a third dimming mode in accordance with an embodiment of the present invention.

In accordance with one embodiment of the present invention, as illustrated in FIG. 4, when the multi-mode dimming circuit 100 is configured to operate in the third dimming mode, the first input terminal 101 is idled, the second input terminal 102 is configured to receive a DC analog signal $V_{analog}$, and the third input terminal 103 is coupled to a third capacitive device 401 such that the oscillation output signal comprises a second triangle signal $V_{triangle2}$. In one embodiment, the oscillation circuit 107 provides a current to charge/discharge the third capacitive device 401 so as to generate the second triangle signal $V_{triangle2}$. In the third dimming mode, the PWM dimming circuit 107 compares the DC analog signal $V_{analog}$ with the second triangle signal $V_{triangle2}$ to t generate the PWM dimming signal $PWM_D$. In this the PWM case, the first duty cycle of the PWM dimming signal $PWM_D$ is modulated by the DC analog signal $V_{analog}$, and the first frequency of the PWM dimming signal $PWM_D$ can be adjusted by adjusting the capacitance of the third capacitive device 401 since changing the capacitance of the third capacitive device 401 may change the frequency of the second triangle signal $V_{triangle2}$.

From the above detailed descriptions, it will be appreciated that the multi-mode dimming circuit 100 in accordance with various embodiments of the present invention could be configured to operate in three different dimming modes. Users could flexibly change the dimming mode of the multi-mode dimming circuit 100 from one to the other by changing the external devices (e.g. the first resistive device 105, the second resistive device 301, the first capacitive device 201, the second capacitive device 202, and the third capacitive device 401) and/or signals (e.g. the PWM input signal $PWM_{IN}$, the DC analog signal $V_{analog}$) provided to each of the first, second and third input terminals 101, 102, and 103. In the first dimming mode, users could vary the frequency of the PWM dimming signal $PWM_D$ by varying the capacitance of the second capacitive device 202, simplifying the realization of vary-frequency PWM dimming. In the second dimming mode, the PWM dimming signal $PWM_D$ may have a frequency and a duty cycle the same as that of the PWM input signal $PWM_{IN}$ when the second resistive device 301 is appropriately chosen so that the DC reference signal $V_{SET}$ lies between the high level and the low level of the PWM input signal $PWM_{IN}$, similar as providing the PWM input signal $PWM_{IN}$ directly to a next stage circuit. In the third dimming mode, the PWM dimming signal $PWM_D$ is generated based on the DC analog signal $V_{analog}$, realizing a DC input PWM dimming function; users could change the duty cycle of the PWM dimming signal $PWM_D$ by varying the amplitude of the DC analog signal $V_{analog}$, and could adjust the frequency of the PWM dimming signal $PWM_D$ by adjusting the capacitance of the third capacitive device 401.

Figure 5:
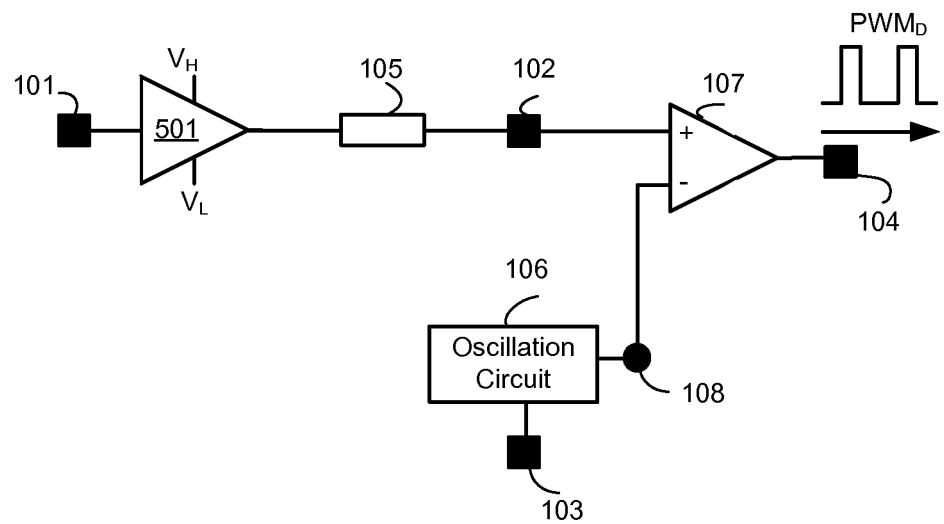
FIG. 5 illustrates schematically a multi-mode dimming circuit with a level-shift circuit in accordance with an embodiment of the present invention.

In one embodiment, as illustrated in FIG. 5, the multi-mode dimming circuit 100 may further comprise a level-shift circuit 501 having a level-shift input terminal coupled to the first input terminal 101, and a level-shift output terminal coupled to the second input terminal 102 via the first resistive device 105, wherein the level-shift circuit 501 is configured to convert a high level and a low level of the signal at the first input terminal 101 respectively to a predetermined high level $V_H$ and a predetermined low level $V_L$. In one embodiment, the predetermined high level $V_H$ may equal to a peak value of the oscillation output signal (e.g. a peak value of the first triangle signal $V_{triangle1}$ in the first dimming mode/a peak value of the second triangle signal $V_{triangle2}$ in the third dimming mode), and the predetermined low level $V_L$ may equal to a valley value of the oscillation output signal (e.g. a valley value of the first triangle signal $V_{triangle1}$ in the first dimming mode/a valley value of the second triangle signal $V_{triangle2}$ in the third dimming mode). In this way, when the multi-mode dimming circuit 100 is configured to operate in the first dimming mode, it is convenient to control the DC voltage signal $PWM_{DC}$ at the second input terminal 102 not to exceed the amplitude range of the first triangle signal $V_{triangle1}$, which is beneficial for generating the PWM dimming signal $PWM_D$; when the multi-mode dimming circuit 100 is configured to operate in the second dimming mode, it is convenient for choosing the resistance of the second resistive device 301 so that the DC reference signal $V_{SET}$ has a value that lies between the predetermined high level $V_H$ and the predetermined low level $V_L$, which is also beneficial for generating the PWM dimming signal $PWM_D$; when the multi-mode dimming circuit 100 is configured to operate in the third dimming mode, it is convenient for choosing the range of the DC analog signal $V_{analog}$.

In the exemplary embodiments shown in FIGS. 1 to 5, the first resistive device 105 may comprise a resistor, the first capacitive device 201 may comprise a capacitor, the second capacitive device 202 may comprise a capacitor, for example a variable capacitor, the second resistive device 301 may comprise a resistor, for example a variable resistor, and the third capacitive device 401 may comprise a capacitor, for example a variable capacitor. In other embodiments, the first resistive device 105, the first capacitive device 201, the second capacitive device 202, the second resistive device 301, and the third capacitive device 401 may comprise other semiconductor devices such as MOSFETs, BJTs etc.

In one embodiment, the PWM circuit 107 may comprise: a comparator having a first comparator input terminal, a second comparator input terminal and a comparator output terminal, wherein the first comparator input terminal is coupled to the second input terminal 102, the second comparator input terminal is coupled to the oscillation output terminal, and the comparator output terminal is coupled to the output terminal 104 of the multi-mode dimming circuit 100, and wherein the comparator is configured to compare the signal at the second input terminal 102 with the oscillation output signal to generate the PWM dimming signal $PWM_D$.

In one embodiment, the oscillation circuit 106 may comprise at least a current source configured to provide a current to the third input terminal 103 of the multi-mode dimming circuit 100.

The above detailed descriptions explain the configurations and working principles of the multi-mode dimming circuit 100 in accordance with various embodiments of the present invention. In the following, various embodiments of separate dimming circuits for realizing each of the three dimming modes will be described.

Referring to FIG. 1 and FIG. 2 together, a dimming circuit in accordance with one embodiment of the present invention comprises: a first input terminal 101 configured to receive a PWM input signal $PWM_{IN}$ having a first duty cycle and a first frequency; a second input terminal 102; a third input terminal 103; an output terminal 104 configured to provide a PWM dimming signal $PWM_D$ having a second duty cycle and a second frequency; a first resistive device 105 having a first terminal coupled to the first input terminal 101, and a second terminal coupled to the second input terminal 102; a first capacitive device 201 having a first terminal coupled to the second input terminal 102, and a second terminal connected to ground; a second capacitive device 202 having a first terminal coupled to the third input terminal 103, and a second terminal connected to ground; an oscillation circuit 106 having an oscillation input terminal coupled to the third input terminal 103, and an oscillation output terminal configured to provide an oscillation output signal; and a PWM circuit 107 having a first PWM input terminal coupled to the second input terminal 102, a second PWM input terminal coupled to the oscillation output terminal, and a PWM output terminal coupled to the output terminal 104, wherein the PWM circuit 107 is configured to compare a signal at the first PWM input terminal with the oscillation output signal to generate the PWM dimming signal $PWM_D$. In this configuration, the first capacitive device 201 and the first resistive device 105 form a low pass filter to filter the PWM input signal $PWM_{IN}$ and provide a DC voltage signal $PWM_{DC}$ to the first PWM input terminal; the oscillation circuit 106 is configured to provide a current to charge/discharge the second capacitive device 202 such that the oscillation output signal comprises a first triangle signal $V_{triangle1}$, and the PWM circuit 107 is configured to compare the DC voltage signal $PWM_{DC}$ with the first triangle signal $V_{triangle1}$ to generate the PWM dimming signal $PWM_D$. Those skilled in the art could understand that the second duty cycle of the PWM dimming signal $PWM_D$ substantially follows the first duty cycle of the PWM input signal $PWM_{IN}$, and the second frequency of the PWM dimming signal $PWM_D$ can be adjusted by adjusting the capacitance of the second capacitive device 202.

In a variant embodiment of the present invention, the dimming circuit described above in reference with FIG. 1 and FIG. 2 may further comprise a level-shift circuit 501 having a level-shift input terminal coupled to the first input terminal 101, and a level-shift output terminal coupled to the second input terminal 102 via the first resistive device 105, wherein the level-shift circuit 501 is configured to convert a high level and a low level of the signal at the first input terminal 101 respectively to a predetermined high level $V_H$ and a predetermined low level $V_L$.

Referring to FIG. 1 and FIG. 3 together, a dimming circuit in accordance with one embodiment of the present invention comprises: a first input terminal 101 configured to receive a PWM input signal $PWM_{IN}$ having a first duty cycle and a first frequency; a third input terminal 103; an output terminal 104 configured to provide a PWM dimming signal $PWM_D$ having a second duty cycle and a second frequency; a first resistive device 105 having a first terminal and a second terminal, wherein the first terminal is coupled to the first input terminal 101; a second resistive device 301 having a first terminal coupled to the third input terminal 103, and a second terminal connected to ground; an oscillation circuit 106 having an oscillation input terminal coupled to the third input terminal 103, and an oscillation output terminal configured to provide an oscillation output signal; and a PWM circuit 107 having a first PWM input terminal coupled to the second terminal of the first resistive device 105, a second PWM input terminal coupled to the oscillation output terminal, and a PWM output terminal coupled to the output terminal 104, wherein the PWM circuit 107 is configured to compare a signal at the first PWM input terminal with the oscillation output signal to generate the PWM dimming signal $PWM_D$. In this configuration, the PWM input signal $PWM_{IN}$ is not filtered and is transmitted to the first PWM input terminal; the oscillation circuit 106 is configured to provide a current to the second resistive device 301 such that the oscillation output signal comprises a DC reference signal $V_{SET}$; and the PWM circuit 107 is configured to compare the PWM input signal $PWM_{IN}$ with the DC reference signal $V_{SET}$ to generate the PWM dimming signal $PWM_D$. Those skilled in the art could understand that in this case the second duty cycle and the second frequency of the PWM dimming signal $PWM_D$ respectively substantially follow the first duty cycle and the first frequency of the PWM input signal $PWM_{IN}$. In other embodiments, the first input terminal 101 and the first resistive device 105 may be omitted, and the first PWM input terminal is configured to receive the PWM input signal $PWM_{IN}$.

Referring to FIG. 1 and FIG. 4 together, a dimming circuit in accordance with one embodiment of the present invention comprises: a second input terminal 102 configured to receive a DC analog signal $V_{analog}$; a third input terminal 103; an output terminal 104 configured to provide a PWM dimming signal $PWM_D$ having a second duty cycle and a second frequency; a third capacitive device 401 having a first terminal coupled to the third input terminal 103, and a second terminal connected to ground; an oscillation circuit 106 having an oscillation input terminal coupled to the third input terminal 103, and an oscillation output terminal configured to provide an oscillation output signal; and a PWM circuit 107 having a first PWM input terminal coupled to the second input terminal 102, a second PWM input terminal coupled to the oscillation output terminal, and a PWM output terminal coupled to the output terminal 104, wherein the PWM circuit 107 is configured to compare a signal at the first PWM input terminal with the oscillation output signal to generate the PWM dimming signal $PWM_D$. In this configuration, the oscillation circuit 106 is configured to provide a current to charge/discharge the third capacitive device 401 such that the oscillation output signal comprises a second triangle signal $V_{triangle2}$, and the PWM circuit 107 is configured to compare the DC analog signal $V_{analog}$ with the second triangle signal $V_{triangle2}$ to generate the PWM dimming signal $PWM_D$. Those skilled in the art could understand that in this case the second duty cycle of the PWM dimming signal $PWM_D$ is modulated by the DC analog signal $V_{analog}$, and the second frequency of the PWM dimming signal $PWM_D$ can be adjusted by adjusting the capacitance of the third capacitive device 401.

From the foregoing, it will be appreciated that specific embodiments of the present invention have been described herein for purposes of illustration, but that various modifications may be made without deviating from the disclosure. Many of the elements of one embodiment may be combined with other embodiments in addition to or in lieu of the elements of the other embodiments. Accordingly, the present invention is not limited except as by the appended claims.

We claim:

1. A multi-mode dimming circuit configurable to operate in a first dimming mode, a second dimming mode or a third dimming mode, comprising:
   a first input terminal;
   a second input terminal;
   a third input terminal;
   an output terminal;
   a first resistive device having a first terminal coupled to the first input terminal, and a second terminal coupled to the second input terminal;
   an oscillation circuit having an oscillation input terminal coupled to the third input terminal, and an oscillation output terminal configured to provide an oscillation output signal; and
   a PWM circuit having a first PWM input terminal coupled to the second input terminal, a second PWM input terminal coupled to the oscillation output terminal, and a PWM output terminal coupled to the output terminal, wherein the PWM circuit is configured to compare a signal at the first PWM input terminal with the oscillation output signal to generate a PWM dimming signal having a first duty cycle and a first frequency; and wherein
   the multi-mode dimming circuit operates in the first dimming mode when the first input terminal is configured to receive a PWM input signal having a second duty cycle and a second frequency, the second input terminal is coupled to a first capacitive device, and the third input terminal is coupled to a second capacitive device such that the oscillation output signal comprises a first triangle signal; and wherein
   the multi-mode dimming circuit operates in the second dimming mode when the first input terminal is configured to receive the PWM input signal, the second input terminal is idled, and the third input terminal is coupled to a second resistive device such that the oscillation output signal comprises a DC reference signal; and wherein
   the multi-mode dimming circuit operates in the third dimming mode when the first input terminal is idled, the second input terminal is configured to receive a DC analog signal, and the third input terminal is coupled to a third capacitive device such that the oscillation output signal comprises a second triangle signal.

2. The multi-mode dimming circuit of claim 1 further comprising a level-shift circuit having a level-shift input terminal coupled to the first input terminal, and a level-shift output terminal coupled to the second input terminal via the first resistive device, wherein the level-shift circuit is configured to convert a high level and a low level of the signal at the first input terminal respectively to a predetermined high level and a predetermined low level.

3. The multi-mode dimming circuit of claim 1, wherein the PWM circuit comprises:
a comparator having a first comparator input terminal, a second comparator input terminal and a comparator output terminal, and wherein
the first comparator input terminal is coupled to the second input terminal, the second comparator input terminal is coupled to the oscillation output terminal, and the comparator output terminal is coupled to the output terminal of the multi-mode dimming circuit, and wherein
the comparator is configured to compare the signal at the second input terminal with the oscillation output signal to generate the PWM dimming signal.

4. The multi-mode dimming circuit of claim 1, wherein the oscillation circuit comprises at least a current source configured to provide a current to the third input terminal of the multi-mode dimming circuit.

5. The multi-mode dimming circuit of claim 1, wherein, when the multi-mode dimming circuit operates in the first dimming mode,
the first resistive device and the first capacitive device forms a low pass filter to filter the PWM input signal and provide a DC voltage signal at the second input terminal;
the oscillation circuit provides a current to charge/discharge the second capacitive device so as to generate the first triangle signal; and
the PWM circuit compares the DC voltage signal at the second input terminal with the first triangle signal to generate the PWM dimming signal.

6. The multi-mode dimming circuit of claim 1, wherein, when the multi-mode dimming circuit operates in the first dimming mode, the first duty cycle of the PWM dimming signal substantially follows the second duty cycle of the PWM input signal, and the first frequency of the PWM dimming signal is being adjusted by adjusting the capacitance of the second capacitive device.

7. The multi-mode dimming circuit of claim 1, wherein, when the multi-mode dimming circuit operates in the second dimming mode,
the oscillation circuit provides a current to the second resistive device so as to generate the DC reference signal; and
the PWM circuit compares the PWM input signal at the second input terminal with the DC reference signal to generate the PWM dimming signal.

8. The multi-mode dimming circuit of claim 1, wherein, when the multi-mode dimming circuit operates in the second dimming mode, the first duty cycle and the first frequency of the PWM dimming signal respectively substantially follow the second duty cycle and the second frequency of the PWM input signal.

9. The multi-mode dimming circuit of claim 1, wherein, when the multi-mode dimming circuit operates in the third dimming mode,
the oscillation circuit provides a current to charge/discharge the third capacitive device so as to generate the second triangle signal; and
the PWM circuit compares the DC analog signal at the second input terminal with the second triangle signal to generate the PWM dimming signal.

10. The multi-mode dimming circuit of claim 1, wherein, when the multi-mode dimming circuit operates in the third dimming mode, the first duty cycle of the PWM dimming signal is modulated by the DC analog signal, and the first frequency of the PWM dimming signal is being adjusted by adjusting the capacitance of the third capacitive device.

11. A dimming circuit comprising:
a first input terminal configured to receive a PWM input signal having a first duty cycle and a first frequency;
a second input terminal;
a third input terminal;
an output terminal configured to provide a PWM dimming signal having a second duty cycle and a second frequency;
a first resistive device having a first terminal coupled to the first input terminal, and a second terminal coupled to the second input terminal;
a first capacitive device having a first terminal coupled to the second input terminal, and a second terminal connected to ground;
a second capacitive device having a first terminal coupled to the third input terminal, and a second terminal connected to ground;
an oscillation circuit having an oscillation input terminal coupled to the third input terminal, and an oscillation output terminal configured to provide an oscillation output signal; and
a PWM circuit having a first PWM input terminal coupled to the second input terminal, a second PWM input terminal coupled to the oscillation output terminal, and a PWM output terminal coupled to the output terminal, wherein the PWM circuit is configured to compare a signal at the first PWM input terminal with the oscillation output signal to generate the PWM dimming signal.

12. The dimming circuit of claim 11, wherein
the first capacitive device and the first resistive device form a low pass filter to filter the PWM input signal and provide a DC voltage signal; and wherein
the oscillation circuit is configured to provide a current to charge/discharge the second capacitive device such that the oscillation output signal comprises a first triangle signal; and wherein
the PWM circuit is configured to compare the DC voltage signal with the first triangle signal to generate the PWM dimming signal.

13. The dimming circuit of claim 11, wherein the second duty cycle of the PWM dimming signal substantially follows the first duty cycle of the PWM input signal, and the second frequency of the PWM dimming signal is being adjusted by adjusting the capacitance of the second capacitive device.

14. The dimming circuit of claim 11 further comprising a level-shift circuit having a level-shift input terminal coupled to the first input terminal, and a level-shift output terminal coupled to the second input terminal via the first resistive device, wherein the level-shift circuit is configured to convert a high level and a low level of the signal at the first input terminal respectively to a predetermined high level and a predetermined low level.

15. A dimming circuit comprising:
a first input terminal configured to receive a DC analog signal;
a second input terminal;
an output terminal configured to provide a PWM dimming signal having a first duty cycle and a first frequency;
a capacitive device having a first terminal coupled to the second input terminal, and a second terminal connected to ground;
an oscillation circuit having an oscillation input terminal coupled to the second input terminal, and an oscillation output terminal configured to provide an oscillation output signal; and
a PWM circuit having a first PWM input terminal coupled to the first input terminal, a second PWM input terminal coupled to the oscillation output terminal, and a PWM output terminal coupled to the output terminal, wherein the PWM circuit is configured to compare a signal at the first PWM input terminal with the oscillation output signal to generate the PWM dimming signal.

16. The dimming circuit of claim 15, wherein the oscillation circuit is configured to provide a current to charge/discharge the capacitive device such that the oscillation output signal comprises a second triangle signal; and wherein the PWM circuit is configured to compare the DC analog signal at the first input terminal with the second triangle signal to generate the PWM dimming signal.

17. The dimming circuit of claim 15, wherein the second duty cycle of the PWM dimming signal is modulated by the DC analog signal, and the second frequency of the PWM dimming signal is being adjusted by adjusting the capacitance of the third capacitive device.

* * * * *